Aug. 11, 1925.
1,549,450
W. B. CLARKSON
CONTROL SYSTEM FOR WELDING APPARATUS
Filed March 3, 1925
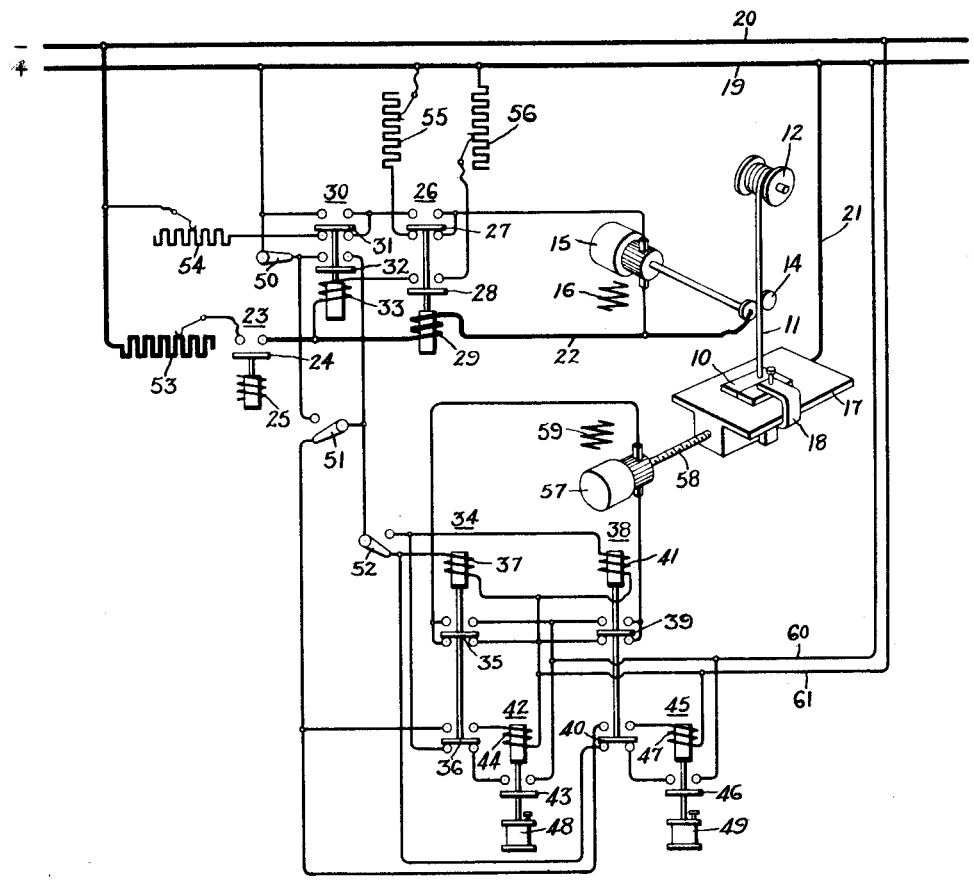
Inventor:
William B. Clarkson;
by Alexander S. [signature]
His Attorney.

Patented Aug. 11, 1925.

1,549,450

UNITED STATES PATENT OFFICE.

WILLIAM B. CLARKSON, OF SCHENECTADY, NEW YORK, ASSIGNOR TO GENERAL ELECTRIC COMPANY, A CORPORATION OF NEW YORK.

CONTROL SYSTEM FOR WELDING APPARATUS.

Application filed March 3, 1925. Serial No. 12,965.

*To all whom it may concern:*

Be it known that I, WILLIAM B. CLARKSON, a citizen of the United States, residing at Schenectady, in the county of Schenectady, State of New York, have invented certain new and useful Improvements in Control Systems for Welding Apparatus, of which the following is a specification.

My invention relates to welding apparatus of the type wherein automatic means are provided for traversing the heating medium such as a gas flame or arc with respect to the work, and more particularly of the type wherein an arc is maintained between a welding electrode and the work, with an arrangement of control apparatus to adjust the relative position of the welding electrode and the work should the arc be extinguished before the end of its travel.

While my invention is particularly intended for arc welding systems in which a metallic pencil or welding electrode is used, it is also applicable to welding systems of gas and arc welding in general.

Means are customarily provided in arc welding systems for traversing the arc along the joint to be welded. Such traversing may be secured by moving the electrode over the work or by moving the work under the electrode. The traversing motion may be effected manually, but, where a completely automatic machine is used, means are ordinarily provided for starting the traversing motion as soon as a proper welding arc has been established and reestablishing the arc if it is extinguished for any reason, and restarting the traversing motion. The mere stopping of the traversing motion sometimes is not sufficient. For example, should the arc be extinguished due to undue lengthening the full amount of metal may not be deposited during this period of lengthening and a weak spot is left in the weld. Furthermore, should the arc be extinguished and merely reestablished a portion of the work will not be welded resulting in holes or inefficient joints.

In accordance with my invention this difficulty is avoided by automatically reestablishing the arc at a point to the rear of the point of cessation of the sound weld.

An object of my invention is to provide an arrangement of apparatus wherein traversing mechanism is arranged to move the work relative to the arc or vice versa and is controlled in such manner as to jog the work or welding head slightly in a reverse direction whenever the arc is extinguished before the end of the contemplated travel.

The novel features which I believe to be characteristic of my invention are set forth with particularity in the appended claims, the invention itself however both as to organization and method of operating, together with further objects and advantages thereof will best be understood by reference to the following description taken in connection with the accompanying drawing in which the single figure diagrammatically illustrates a welding system embodying my invention.

Referring to the drawing, the welding arc is struck and maintained between the work 10 and the electrode 11, which is represented as a metallic electrode fed from the reel 12. The means for feeding the electrode are represented as comprising feed rolls 14 operated through speed reducing gearing (not shown) from an electric motor 15, provided with a field winding 16 energized from any suitable source. The work 10 may be secured to a suitable support 17 by any convenient means such as clamp 18. The work is represented as connected to the positive line 19 of a constant potential source of supply by the main 21. The welding electrode 11 is shown connected to the negative line 20 of the constant potential source of supply by the lead 22 and contact 24. The work support 17 is here shown as capable of being traversed with respect to the welding pencil by means of an electric motor 57, hereinafter referred to as the travel motor, through the agency of suitable means shown as a threaded shaft 58. The motor 57 is provided with a field winding 59 energized from any suitable source. It is of course obvious that the work may remain stationary and the welding head be given the same movement as will be hereinafter described with respect to the work or work table.

The various circuits are controlled in the arrangement shown in the drawing by five contactors. Contactor 23 is provided with a contact 24 and controlled by operating coil 25. Contactor 26 is controlled by a coil 29 in series with the welding electrode and is provided with contacts 27 and 28. Contactor 30 is controlled by a shunt coil 33, the circuit of which is controlled by the contact 28 of contactor 26, and is provided with contacts 31 and 32. Contactor 34 is controlled by operating coil 37 which is in series with interlock contact 32 on contactor 30 and is provided with contacts 35 and 36. Contactor 38 is controlled by operating coil 41 and is provided with contacts 39 and 40. Contactors 42 and 45 are each provided with time delay devices, 48 and 49, contacts 43 and 46, and controlled by operating coils 44 and 47 respectively.

The switch 50 is inserted in the circuit for the travel motor in such a manner as to constitute a "run" and "stop" device. This switch may be a normally closed push button or may be remotely controlled by push buttons if desired. The switch 52 is provided with two contact points and in the position shown completes a break in the circuit through operating coil 37 of contactor 34 which is instrumental in maintaining a circuit through the travel motor 57 so as to cause a direction of rotation referred to herein as "forward." Switch 52 when moved to its second contact completes a break in the circuit through coil 41 of contactor 38 so as to cause a direction of rotation referred to herein as "reverse." The switch 51 is provided with two contact points and in the position shown is inserted in the circuit so that the operation of the travel motor will be "automatic" whereas when moved to its second contact point the circuit of the travel motor will be in a condition for manual operation. Resistor 53 is a series stabilizing resistor which may be adjusted to permit the flow of any desired welding current when the arc is supplied from a constant potential source. Resistors 54, 55 and 56 are provided to limit the flow of current in the various control circuits and their utility will be pointed out in the following description of the operation of the system.

The operation of the system shown in the drawing is as follows: When the operator desires to begin welding contactor 23 is closed by means of the usual push button control, not shown, through the agency of its operating coil 25 energized from any suitable source. A circuit is completed through the armature of the electrode feed motor 15 from the positive line 19, resistor 55, contact 27, the armature, lead 22, series coil 29, contact 24, resistor 53 to the negative line 20. The motor 15 feeds the electrode 11 into contact with the work 10, whereupon operating coil 29 is strongly energized and contactor 26 picks up completing a reversing circuit through the electrode feed motor. This circuit leads from lead 22, which is now at substantially the potential of line 19, through the armature, contact 27 in its upper position, contact 31 in its lower position, resistor 54, to the negative line 20. The motor 15 withdraws the electrode 11 from the work and establishes the arc and at a predetermined arc voltage contactor 30 picks up and connects the motor 15 directly across the arc for operation in a direction to feed the electrode toward the work to maintain the arc. This circuit leads from the positive line 19 which is connected to the work 10, contact 31, bridging the upper contact points of contactor 30, contact 27, bridging the upper contact points of contactor 26, and the armature, to the electrode 11. The motor 15 being thus in shunt to the arc, operates to maintain the arc at a substantially constant length. Any tendency of the arc to lengthen causes the motor to speed up and any tendency of the arc to shorten causes the motor to slow down, as is now well known in the art.

When contactor 30 picks up, contact 32 completes a circuit from the positive line 19, switch 50, contact 32, switch 52, operating coil 37, lead 61 to the negative line 20, whereupon contactor 34 picks up and contact 35 bridges its upper contact points completing a circuit for operating travel motor 57 in the "forward" direction. This circuit leads from the positive line 19, lead 60, contact 35, the motor armature, contact 39, lead 61 to the negative line 20. The picking up of contactor 34 also causes its lower contact 36 to complete a circuit through operating coil 44 of the contactor 42 which picks up. Contact 43 of contactor 42 closes, but does not complete any circuit, since contact 36 is in its upper position.

If now the arc should fail, either by open circuiting or short circuiting, contactor 30 will drop out thereby deenergizing the controlling coils of contactors 34 and 42. Contactor 34 drops at once to its lower position but contactor 42 is delayed in opening so that a circuit is completed from the positive line 19, lead 60, contact 43, contact 36, operating coil 41 of contactor 38, lead 61 to the negative line 20. The contact 39, therefore, moves to its upper position and a reverse circuit through the armature of the travel motor 57 is completed from the positive line 19, lead 60, contact 39, the motor armature, contact 35 which is in its lower position, lead 61, to the negative line 20. This circuit remains completed until the retarded contactor 42 opens its circuit, at which time reversing contactor 38 is deenergized and both contacts 35 and 39 are in the lower position establishing a dynamic braking circuit for the travel motor 57 thus bringing it to a stop with the electrode slightly in the rear of the place where it was when the arc was interrupted.

When the arc has completed its contemplated travel or the weld is completed, the operation may be discontinued by opening contactor 23 either automatically or manually thereby interrupting the arc circuit and control circuits for the travel motor.

If the machine is used for welding in either direction switch 52 or its push button equivalent will be moved so that it will be in the upper or "reverse" position instead of the "forward" position as previously described. With the switch 52 in such position, the picking up of contactor 30 will complete the circuit of the contactor 38 instead of the contactor 34 as above described. When contactor 38 picks up, contact 39 completes a circuit to the travel motor 57, in the reverse direction. When contactor 38 picks up, contact 40 thereon completes a circuit to energize operating coil 47 of contactor 45 which picks up but does not complete any circuit because contact 40 is in its upper position. Whenever the arc fails, contactor 38 drops out and when contact 40 moves to its lower position a circuit is completed from the positive line 19, lead 60, contact 46, contact 40, operating coil 37 of contactor 34, lead 61 to the negative line 20. Contactor 34 is now in a position to jog the travel motor 57 in the other direction, which, in this case, is in the direction previously referred to as the "forward" direction.

If it is desired to operate the travel motor manually, the switch 51 is moved from its lower or "automatic" position to its upper or "manual" position thus short circuiting the interlock contact 32 of contactor 30. By operating the switch 50 the operator can start and stop the travel motor independently of contactor 30 and by operating switch 52 he can control the direction in which the travel motor operates.

While I have shown the electrode feed motor as controlled by series and shunt contactors 26 and 30, respectively, utilizing the contactor 30 to control the travel motor, it is to be understood that my invention in its broader aspects is not limited to any particular arrangement for striking and maintaining the arc nor to any particular type of travel mechanism, but is applicable to any arrangement controlled in response to the electrical condition of the arc or other heating means automatically to jog the travel mechanism backward for the purpose described.

For convenient illustration I have represented the contactors 42 and 45 as provided with dash pots having relief valves to cause the contactors to open with a predetermined time delay. This is merely a conventional illustration of a contactor which is retarded in opening and it is to be understood that this is the equivalent of analogous types of retarded opening circuit interrupters.

While I have represented the invention in a constant potential type series resistor system, it is to be understood that the invention may be used with any type of welding system, whether constant current or supplied from a three-brush generator of the type disclosed in the United States Letters Patent to Sven R. Bergman, 1,340,004, May 11, 1920, or any other inherently regulated generator wherein the generator is connected to the arc. It will be observed that all the control circuits for the travel motor are energized across the constant potential mains in the system illustrated and, therefore, any convenient source can be used for supplying these circuits.

While I have shown and described a particular embodiment of my invention it will be obvious to those skilled in the art that changes and modifications may be made without departing from my invention, and I, therefore, aim in the appended claims to cover all such changes and modifications that fall within the true spirit and scope of my invention.

What I claim as new and desire to secure by Letters Patent of the United States, is:—

1. A welding system of the type wherein means are provided for producing a relative motion of traverse between the work and the heating medium characterized by the fact that means, including a device responsive to the condition of the heating medium, are provided for imparting a limited reverse traversing movement whenever the heating medium fails before the end of the contemplated travel.

2. A welding system of the type wherein a reversible travel mechanism is provided for producing a relative motion of traverse between the work and the heating medium, means responsive to the condition of the heating medium influencing said travel mechanism for imparting a limited reverse traversing movement whenever the heating medium fails before the end of the contemplated travel.

3. A welding system of the type wherein a reversible electric motor is provided for producing a relative motion of traverse between the work and the heating medium, electrical control means responsive to the condition of the heating medium for said reversible motor for imparting a limited reverse traversing movement whenever the heating medium fails before the end of the contemplated travel.

4. An arc welding system wherein means are provided for producing a relative motion of traverse between the welding arc and the work, means including a device responsive to the condition of the arc for imparting to said traversing means a limited reverse traversing movement whenever the arc fails before the end of the contemplated travel.

5. An electric arc welding system of the type wherein the welding arc is maintained between the welding electrode and the work and wherein means are provided for producing a relative motion of traverse between said electrode and the work characterized by the fact that means, including a device responsive to the condition of the arc, are provided for imparting a limited reverse traversing movement whenever the arc fails before the end of the contemplated travel.

6. An electric arc welding system of the type wherein the welding arc is maintained between the work constituting one electrode and a welding rod constituting the other electrode, and wherein means are provided for producing a relative motion of traverse between said electrodes characterized by the fact that means, including a device responsive to the condition of the arc, are provided for imparting a limited reverse traversing movement whenever the arc fails before the end of the contemplated travel.

7. An electric arc welding system of the type wherein the welding arc is maintained between the work constituting one electrode and a welding rod constituting the other electrode, and wherein a reversible electric motor is provided for producing a relative motion of traverse between said electrodes, electrical control means responsive to the condition of the arc for said reversible motor for imparting a limited reverse traversing movement whenever the arc fails before the end of the contemplated travel.

8. An electric arc welding apparatus of the type wherein the welding arc is maintained between the work constituting one electrode and a welding rod constituting the other electrode, and wherein a reversible electric motor is provided for producing a progressive relative motion of traverse between said electrodes, electrical control means influenced by a condition of the arc for controlling the circuit connections of said motor, said circuit controlling means being arranged to reverse said motor to position the arc slightly to the rear of the point of interruption in the weld whenever the arc is extinguished before the end of the contemplated travel.

9. An automatic arc welding apparatus comprising automatic means for maintaining a welding arc between a welding electrode and the work, a reversible electric motor for producing a relative traverse between the electrode and the work, electrical control means for said motor comprising an electromagnetic device influenced by the condition of the arc for controlling a circuit for said motor to impart rotation in one direction, a second retarded opening electromagnetic device vontrolled by said first electromagnetic device, a third electromagnetic device influenced by said first and second electromagnetic devices to control a reversing circuit for said motor, to position the arc slightly to the rear of the point of interruption in the weld whenever the arc is extinguished before the end of the contemplated travel.

10. An arc welding system of the type wherein the welding arc is maintained between the work constituting one electrode and a welding rod constituting the other electrode, wherein a source of current is provided for supplying the welding current to the electrode, an electric motor for feeding the rod toward and away from the work to strike the arc and toward the work to maintain the arc, a reversible electric motor for producing a relative motion of traverse between said electrodes, electrical control means for said reversible motor to position the arc at a point slightly to the rear of point of interruption in the weld whenever the arc is extinguished before the end of the contemplated travel.

In witness whereof, I have hereunto set my hand this 2nd day of March, 1925.

WILLIAM B. CLARKSON.